(12) United States Patent
Lapir et al.

(10) Patent No.: US 8,321,357 B2
(45) Date of Patent: Nov. 27, 2012

(54) METHOD AND SYSTEM FOR EXTRACTION

(76) Inventors: Gennady Lapir, Merzhausen (DE);
Harry Urbschat, Oldenburg (DE);
Ralph Meier, Freiburg (DE); Thorsten Wanschura, Oldenburg (DE); Johannes Hausmann, Marseilles (FR)

(*) Notice: Subject to any disclaimer, the term of this patent is extended or adjusted under 35 U.S.C. 154(b) by 473 days.

(21) Appl. No.: 12/570,412

(22) Filed: Sep. 30, 2009

(65) Prior Publication Data

US 2011/0078098 A1    Mar. 31, 2011

(51) Int. Cl.
*G06N 5/00*    (2006.01)
(52) U.S. Cl. ............................................. 706/12; 706/45
(58) Field of Classification Search .................. 706/12, 706/45
See application file for complete search history.

(56) References Cited

U.S. PATENT DOCUMENTS

| | | |
|---|---|---|
| 4,731,861 A | 3/1988 | Blanton et al. |
| 4,799,188 A | 1/1989 | Yoshimura |
| 4,864,501 A | 9/1989 | Kucera et al. |
| 5,191,525 A | 3/1993 | LeBrun et al. |
| 5,201,047 A | 4/1993 | Maki et al. |
| 5,245,672 A | 9/1993 | Wilson et al. |
| 5,267,165 A | 11/1993 | Sirat |
| 5,276,870 A | 1/1994 | Shan et al. |
| 5,344,132 A | 9/1994 | LeBrun et al. |
| 5,537,491 A | 7/1996 | Mahoney et al. |
| 5,546,503 A | 8/1996 | Abe et al. |
| 5,550,931 A | 8/1996 | Bellegarda et al. |
| 5,619,709 A | 4/1997 | Caid et al. |
| 5,649,068 A | 7/1997 | Boser et al. |
| 5,671,333 A | 9/1997 | Catlett et al. |
| 5,675,710 A | 10/1997 | Lewis |
| 5,689,620 A | 11/1997 | Kopec et al. |
| 5,778,362 A | 7/1998 | Deerwester |
| 5,787,201 A | 7/1998 | Nelson et al. |
| 5,794,178 A | 8/1998 | Caid et al. |
| 5,809,476 A | 9/1998 | Ryan |
| 5,864,855 A | 1/1999 | Ruocco et al. |
| 5,889,886 A | 3/1999 | Mahoney |
| 5,918,223 A | 6/1999 | Blum et al. |
| 5,956,419 A | 9/1999 | Kopec et al. |
| 6,006,221 A | 12/1999 | Liddy et al. |
| 6,043,819 A | 3/2000 | LeBrun et al. |

(Continued)

FOREIGN PATENT DOCUMENTS

EP    0 320 266    6/1989

(Continued)

OTHER PUBLICATIONS

Dave, et al., Mining the Peanut Gallery: Opinion Extraction and Semantic Classification of Product Reviews, ACM 1-58113-680-3/03/0005, May 20-24, 2003, pp. 1-10.*

Dreier, Blog Fingerprinting: Identifying Anonymous Posts Written by an Author of Interest Using Word and Character Frequency Analysis, Master's Thesis, Naval Postgraduate School, Monterey, California, Sep. 2009, pp. 1-93.*

File History of U.S. Appl. No. 12/208,088, for Jan. 12, 2012 to May 9, 2012.

File History of U.S. Appl. No. 12/610,915, for Nov. 30, 2011 to May 9, 2012.

File History of U.S. Appl. No. 12/610,937, for Sep. 22, 2011 to May 9, 2012.

(Continued)

*Primary Examiner* — Wilbert L Starks
(74) *Attorney, Agent, or Firm* — DLA Piper LLP US

(57) ABSTRACT

A system and method for extracting information from at least one document in at least one set of documents, the method comprising: generating, using at least one ranking and/or matching processor, at least one ranked possible match list comprising at least one possible match for at least one target entry on the at least one document, the at least one ranked possible match list based on at least one attribute score and at least one localization score.

39 Claims, 9 Drawing Sheets

U.S. PATENT DOCUMENTS

| | | | |
|---|---|---|---|
| 6,076,088 | A | 6/2000 | Paik et al. |
| 6,101,515 | A | 8/2000 | Wical et al. |
| 6,115,708 | A | 9/2000 | Fayyad et al. |
| 6,161,130 | A | 12/2000 | Horvitz et al. |
| 6,185,576 | B1 | 2/2001 | McIntosh |
| 6,188,010 | B1 | 2/2001 | Iwamura |
| 6,192,360 | B1 | 2/2001 | Dumais et al. |
| 6,212,532 | B1 | 4/2001 | Johnson et al. |
| 6,243,713 | B1 | 6/2001 | Nelson et al. |
| 6,275,610 | B1 | 8/2001 | Hall, Jr. et al. |
| 6,289,334 | B1 | 9/2001 | Reiner et al. |
| 6,324,551 | B1 | 11/2001 | Lamping et al. |
| 6,327,387 | B1 | 12/2001 | Naoi et al. |
| 6,477,551 | B1 | 11/2002 | Johnson et al. |
| 6,622,134 | B1 | 9/2003 | Sorkin |
| 6,665,668 | B1 | 12/2003 | Sugaya et al. |
| 6,665,841 | B1 | 12/2003 | Mahoeny et al. |
| 6,732,090 | B2 | 5/2004 | Shanahan et al. |
| 6,741,724 | B1 | 5/2004 | Bruce et al. |
| 6,741,959 | B1 | 5/2004 | Kaiser |
| 6,772,164 | B2 | 8/2004 | Reinhardt |
| 6,944,340 | B1 | 9/2005 | Shah |
| 6,976,207 | B1 | 12/2005 | Rujan et al. |
| 6,983,345 | B2 | 1/2006 | Lapir et al. |
| 7,149,347 | B1 | 12/2006 | Wnek |
| 7,433,997 | B2 | 10/2008 | Lapir et al. |
| 7,440,938 | B2 | 10/2008 | Matsubayashi et al. |
| 7,472,121 | B2 | 12/2008 | Kothari et al. |
| 7,509,578 | B2 | 3/2009 | Rujan et al. |
| 7,610,281 | B2 | 10/2009 | Gandhi et al. |
| 7,720,721 | B1 | 5/2010 | Goldstein et al. |
| 7,805,446 | B2 | 9/2010 | Potok et al. |
| 8,015,198 | B2 | 9/2011 | Rabald et al. |
| 2001/0042083 | A1 | 11/2001 | Saito et al. |
| 2002/0022956 | A1 | 2/2002 | Ukrainczyk et al. |
| 2002/0023085 | A1 | 2/2002 | Keith, Jr. |
| 2002/0129015 | A1 | 9/2002 | Caudill et al. |
| 2002/0156816 | A1 | 10/2002 | Kantrowitz et al. |
| 2003/0099399 | A1 | 5/2003 | Zelinski |
| 2004/0049411 | A1 | 3/2004 | Suchard et al. |
| 2004/0243601 | A1 | 12/2004 | Toshima |
| 2004/0255218 | A1 | 12/2004 | Tada et al. |
| 2005/0021508 | A1 | 1/2005 | Matsubayashi et al. |
| 2005/0160369 | A1 | 7/2005 | Balabanovic et al. |
| 2007/0033252 | A1 | 2/2007 | Combest |
| 2007/0091376 | A1 | 4/2007 | Calhoon et al. |
| 2007/0244882 | A1 | 10/2007 | Cha et al. |
| 2007/0288882 | A1 | 12/2007 | Kniffin et al. |
| 2008/0040660 | A1 | 2/2008 | Georke et al. |
| 2008/0126335 | A1 | 5/2008 | Gandhi et al. |
| 2008/0208840 | A1 | 8/2008 | Zhang et al. |
| 2008/0212877 | A1 | 9/2008 | Franco |
| 2009/0198677 | A1 | 8/2009 | Sheehy et al. |
| 2009/0228777 | A1 | 9/2009 | Henry et al. |
| 2009/0274374 | A1 | 11/2009 | Hirohata et al. |

FOREIGN PATENT DOCUMENTS

| | | |
|---|---|---|
| EP | 0 572 807 | 12/1993 |
| EP | 0 750 266 | 12/1996 |
| EP | 1049030 | 11/2000 |
| EP | 1 128 278 | 8/2001 |
| EP | 1 182 577 | 2/2002 |
| EP | 1 288 792 | 3/2003 |
| EP | 1 315 096 | 5/2003 |
| GB | 2172130 | 9/1986 |
| JP | 11-184894 | 7/1999 |
| WO | WO 88/01411 | 2/1988 |
| WO | WO 89/04013 | 5/1989 |
| WO | WO 91/10969 | 7/1991 |
| WO | WO 98/01808 | 1/1998 |
| WO | WO 98/47081 | 10/1998 |
| WO | WO 01 42984 | 6/2001 |
| WO | WO 01/63467 | 8/2001 |
| WO | WO 02/15045 | 2/2002 |
| WO | WO 03/019524 | 3/2003 |
| WO | WO 03/044691 | 5/2003 |

OTHER PUBLICATIONS

A. Krikelis et al., "Associative Processing and Processors" Computer, US, IEEE Computer Society, Long Beach, CA, US, vol. 27, No. 11, Nov. 1, 1994, pp. 12-17, XP000483129.

International Search Report issued in related International Application No. PCT/EP01/09577, mailed Nov. 5, 2003.

Motonobu Hattori, "Knowledge Processing System Using Mulit-Mode Associate Memory", IEEE, vol. 1, pp. 531-536 (May 4-9, 1998).

International Search Report issued in International Application No. PCT/EP01/01132, mailed May 30, 2001.

H. Saiga et al., "An OCR System for Business Cards", Proc. of the 2nd Int. Conf. on Document Analysis and Recognition, Oct. 20-22, 1993, pp. 802-805, XP002142832.

Junliang Xue et al., "Destination Address Block Location on handwritten Chinese Envelope", Proc. of the 5th Int. Conf. on Document Analysis and Recognition, Sep. 20-22, 1999, pp. 737-740, XP002142833.

Machine Translation of JP 11-184894.

Simon Berkovich et al., "Organization of Near Matching in Bit Attribute Matrix Applied to Associative Access Methods in Information Retrieval", Pro. of the 16th IASTED Int. Conf. Applied Informatics, Feb. 23-25, 1998, Garmisch-Partenkirchen, Germany.

European Office Action issued in Application No. 01127768.8 mailed Sep. 10, 2008.

European Office Action issued in Application No. 01120429.4 mailed Sep. 16, 2008.

D. Frietag, "Information extraction from HTML: application of a general machine learning approach", Pro. 15th National Conference on Artificial Intelligence (AAAI-98); Tenth Conference on Innovative Applications of Artificial Intelligence, Proceedings of the Fifteenth National Conference on Artificial Intelligence, Madison, WI, USA pp. 517-523, SP002197239 1998, Menlo Park, CA, USA, AAAI Press/MIT Press, USA ISBN: 0-262-51098-7.

European Office Action issued in Application No. 01120429.4 mailed Jun. 30, 2006.

European Office Action issued in Application No. 01120429.4 mailed Apr. 23, 2004.

E. Appiani et al., "Automatic document classification and indexing in high-volume applications", International Journal on Document Analysis and Recognition, Dec. 2001, Springer Verlag, Germany, vol. 4, No. 2, pp. 69-83, XP002197240, ISSN: 1433-2833.

A. Ting et al., "Form recognition using linear structure", Pattern Recognition, Pergamon Press Inc., Elmsford, NY, US, vol. 32, No. 4, Apr. 1999, pp. 645-656, XP004157536, ISSN: 0031-3203.

International Search Report issued in International Application PCT/US02/27132 issued Nov. 12, 2002.

"East text search training", Jan. 2000.

European Search Report issued in European Office Action 01120429.4 mailed Jul. 19, 2002.

International Search Report issued in International Application PCT/DE97/01441, mailed Nov. 12, 1997.

Voorheas et al., "Vector expansion in a large collection", NIST Special Publication, US, Gaithersburg, MD pp. 343-351.

M. Marchard et al., "A Convergence Theorem for Sequential Laming in Two-Layer Perceptrons", Europhysics Letters, vol. 11, No. 6, Mar. 15, 1990, pp. 487-492.

F. Aurenhammer, Voronoi Diagrams—"A survey of a fundamental geometric data structure", ACM Computing Surveys, vol. 23, No. 3, Sep. 1991, pp. 345-405.

C. Reyes et al., "A Clustering Technique for Random Data Classification", International Conference on Systems, Man and Cybernetics, IEEE, p. 316-321.

International Search Report issued in PCT/EP00/03097 mailed Sep. 14, 2000.

International Preliminary Examination Report issued in PCT/EP00/03097 mailed Jul. 31, 2001.

Written Opinion issued in PCT/EP00/03097 mailed Apr. 21, 2001.

Japanese Office Action issued in Japanese Application No. 2003-522903, mailed Jul. 29, 2008.

English language translation of Japanese Office Action issued in Japanese Application No. 2003-522903, mailed Jul. 29, 2008.

European Office Action issued in European Application No. 01 905 729.8, mailed Nov. 22, 2007.
Foreign Office Action issued in EP 00117850.8 mailed May 20, 2008.
Foreign Office Action issued in EP 00117850.8 mailed Jul. 20, 2006.
EP Search Report issued in EP 00117850.8 mailed Jun. 12, 2001.
International Notification issued in PCT/EP00/03097 mailed May 5, 2001.
G. Lapir, "Use of Associative Access Method for Information Retrieval System", Proc. 23rd Pittsburg Conf. on Modeling & Simulation, 1992, pp. 951-958.
Witten et al., "Managing Gigabytes" pp. 128-142.
C.J. Date, "An Introduction to Database Systems, Sixth Edition", Addison-Wesley Publishing Company, pp. 52-65 (1995).
International Search Report for PCT/US00/23784 mailed Oct. 26, 2000.
Australian Office Action in Australian application 2002331728 mailed Nov. 16, 2006.
Australian Notice of Acceptance issued in Australian application 2002331728 mailed Feb. 20, 2008.
Foreign Office Action issued in EP 01127768.8 mailed Feb. 5, 2007.
Foreign Office Action issued in EP 01127768.8 mailed Sep. 8, 2005.
Bo-ren Bai et al. "Syllable-based Chinese text/spoken documents retrieval using text/speech queries", Int'l Journal of Pattern Recognition.
Foreign Search Report issued in EP 01127768.8 mailed Sep. 12, 2002.
European Search Report issued in EP 00103810.8, mailed Aug. 1, 2000.
European Office Action issued in EP 00103810.8, mailed May 23, 2002.
International Preliminary Examination Report issued in International Application No. PCT/DE97/01441, mailed Jul. 21, 1998.
European Office Action issued in EP 00926837.6, mailed Nov. 28, 2006.
European Office Action issued in EP 00926837,6, mailed Oct. 11, 2007.
Australian Office Action issued in AU 2001282106, mailed Jul. 18, 2006.
Australian Office Action issued in AU 2001233736, mailed Aug. 26, 2005.
Australian Office Action issued in AU 2001233736, mailed Aug. 23, 2006.
European Office Action issued in EP 97931718.7, mailed Jul. 9, 2001.
European Office Action issued in EP 97931718.7, mailed May 8, 2002.
International Search Report issued in International Application No. PCT/EP98/00932, mailed Jul. 28, 1998.
Richard G. Casey et al., "A Survey of Methods and Strategies in Character Segmentation", IEEE Transactions on Pattern Analysis and machine Intelligence, vol. 18, No. 7, pp. 690-706 (Jul. 1996).
File History of U.S. Appl. No. 11/240,525.
File History of U.S. Appl. No. 09/561,196.
File History of U.S. Appl. No. 11/240,632.
File History of U.S. Appl. No. 10/362,027.
File History of U.S. Appl. No. 12/191,774.
File History of U.S. Appl. No. 12/106,450.
File History of U.S. Appl. No. 10/204,756.
File History of U.S. Appl. No. 12/208,088.
File History of U.S. Appl. No. 12/588,928.
File History of U.S. Appl. No. 12/610,915.
File History of U.S. Appl. No. 10/610,937.
International Search Report issued in PCT/IB2010/003251, mailed May 2, 2011.
Written Opinion issued in PCT/IB2010/003251, mailed May 2, 2011.
International Search Report issued in PCT/IB2010/003250, mailed May 2, 2011.
Written Opinion issued in PCT/IB2010/003250, mailed May 2, 2011.
Suzanne Liebowitz Taylor et al., "Extraction of Data from Preprinted Forms," Machine vision and Applications, vol. 5, pp. 211-222; Jan. 1992.
International Search Report issued in PCT/IB2010/050087, mailed May 27, 2011.
Written Opinion issued in PCT/IB2010/050087, mailed May 27, 2011.
File History of U.S. Appl. No. 12/610,937.
File History of U.S. Appl. No. 13/024,086.
File History of U.S. Appl. No. 13/192,703.
File History of U.S. Appl. No. 10/204,756, for Dec. 1, 2011 to Jan. 11, 2012.
File History of U.S. Appl. No. 12/208,088, for Dec. 1, 2011 to Jan. 11, 2012.
File History of U.S. Appl. No. 13/024,086, for Sep. 23, 2011 to Jan. 11, 2012.
File History of U.S. Appl. No. 13/192,703, for Sep. 23, 2011 to Jan. 11, 2012.
James Wnek, "Learning to Identify Hundreds of Flex-Form Documents", IS&T /SPIE Conference on Document Recognition and Retrieval VI, San Jose, CA, SPIE vol. 3651, pp. 173-182 (Jan. 1999).
File History of U.S. Appl. No. 10/208,088.
European Office Action issued in EP 01127768.8, mailed Feb. 17, 2011.
R.M. Lea et al., "An Associative File Store Using Fragments for Run-Time Indexing and Compression", SIGIR'80, Proceedings of the 3rd Annual ACM Conference on Research and Development in Information Retrieval, pp. 280-295 (1980).
M. Koga et al., "Lexical Search Approach for Character-String Recognition", DAS'98, LNCS 1655, pp. 115-129 (1999).
File History of U.S. Appl. No. 10/204,756 for Sep. 22, 2011 to Nov. 30, 2011.
File History of U.S. Appl. No. 12/610,915 for Sep. 22, 2011 to Nov. 30, 2011.
File History of U.S. Appl. No. 12/208,088 for May 12, 2011 to Nov. 30, 2011.
Office Action issued in Canadian Application No. CA 2,419,776, dated Aug. 16, 2011.
Notice of Allowance issued in Canadian Application No. 2,459,182, dated Oct. 28, 2011.
International Search Report issued in PCT/IB2010/003252, mailed Jan. 24, 2012.
Written Opinion issued in PCT/IB2010/003252, mailed Jan. 24, 2012.
A. Dengal et al., "Chapter 8:: Techniques for Improving OCR Results", Handbook of Character Recognition and Document Image Analysis, pp. 227-258, Copyright 1997 World Scientific Publishing Company.
Remy Mullot, "Les Documents Ecrits", Jan. 1, 2006, Lavoisier—Hermes Science, pp. 351-355, "Section 7.6.3 Reconnaissance des caracteres speciaux ou endornmages".
L. Solan, "The Language of the Judges", University of Chicago Press, pp. 45-54, Jan. 1, 1993.
File History of U.S. Appl. No. 13/024,086 for Jan. 11, 2012 to Mar. 8, 2012.
Office Action issued in Canadian Patent Application No. 2,459,182, mailed Oct. 26, 2010.
File History of U.S. Appl. No. 10/204,756, for Jun. 21, 2012 to Sep. 21, 2012.
File History of U.S. Appl. No. 12/208,088, for Jun. 21, 2012 to Sep. 21, 2012.
File History U.S. Appl. No. 12/588,928, for Jun. 21, 2012 to Sep. 21, 2012.
File History of U.S. Appl. No. 12/610,915, for Jun. 21, 2012 to Sep. 21, 2012.
File History of U.S. Appl. No. 13,192,703, for Jun. 21, 2012 to Sep. 21, 2012.

* cited by examiner

METHOD AND SYSTEM FOR EXTRACTION

DESCRIPTION OF EMBODIMENTS OF THE INVENTION

Figure 1:
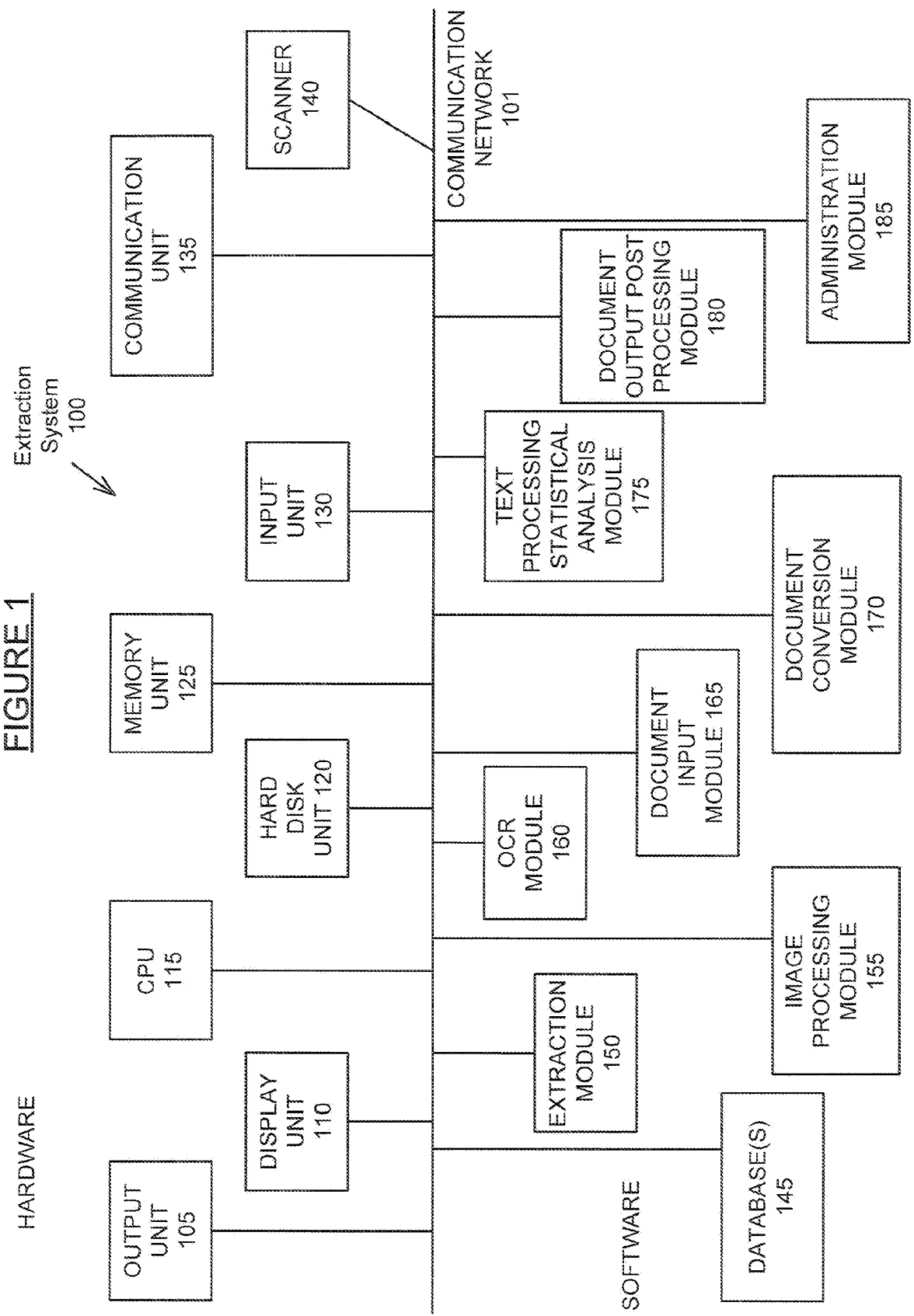
FIG. 1 illustrates an extraction system, according to one embodiment.

FIG. 1 illustrates an extraction system 100, according to one embodiment. In one embodiment, the extraction system 100 facilitates automatic, self-adapting and learning document processing. In one embodiment, the extraction system 100 learns by example (e.g., learns the characteristics of invoices from a stack of documents known to be invoices) and then uses information from the documents (e.g., based on comparisons, statistical scoring methods, fuzzy features) related to context and context-relations for certain fields to find similar information in other documents. The extraction system 100 can, for example, extract data, classify documents, and generate knowledge about the documents useful for other tasks, such as, but not limited to, page separation, document merging, sheet-recovery, form-recognition, form-generalization, document corruption recognition and repair, optical character recognition (OCR) error correction or any combination thereof. The extraction system 100 can work with documents such as, but not limited to, invoices, remittance statements, bills of lading, checks, voting bills, forms, diagrams, printed tabular information, or certificates, or any combination thereof. The extraction system 100 can process any at least weakly structured document (containing at least some textual parts) where information (in the form of specific target fields) needs to be extracted. Documents can be single or multi-page. In addition, documents can be in the English language, or any other language, or in a combination of languages. The extraction system 100 can also process one language or multiple languages at a time.

In one embodiment, the extraction system 100 can comprise a communication network 101 that connects hardware and software elements. The hardware can comprise an output unit 105, a display unit 110, a centralized processing unit (CPU) 115, a hard disk unit 120, a memory unit 125, an input unit 130, a communication unit 135, and a scanner 140. The output unit 105 can send results of extraction processing to, for example, a screen, printer, disk, computer and/or application. The display unit 110 can display information. The CPU 115 can interpret and execute instructions from the hardware and/or software components. The hard disk unit 120 can receive information (e.g., documents, data) from a hard disk or similar storage devices. The memory unit 125 can store information. The input unit 130 (e.g., keyboard, mouse, other human or non-human input device) can receive information for processing from a screen, scanner, disk, computer and/or application. The communication unit 135 can communicate with other computers. The scanner 140 can acquire a document image(s) from paper.

The software can comprise one or more databases 145, an extraction module 150, an image processing module 155, an OCR module 160, a document input module 165, a document conversion module 170, a text processing statistical analysis module 175, a document/output post processing module 180, and a systems administration module 185. The database 145 can store information, for example about the training sets. The image processing module 155 can include software which can process images. The OCR module 160 includes software which can generate a textual representation of the image scanned in by the scanner. The document input module 165 can include software which can work with preprocessed documents (e.g., preprocessed in extraction system 100 or elsewhere) to obtain information (e.g., training sets). Document representation (e.g., images and/or OCR text) can be sent to the extraction module 150. The document conversion module 170 can include software which can transform a document from one form to another (e.g., from Word to PDF). A text processing statistical analysis module 175 can include software which can provide statistical analysis of the generated text to pre-process the textual information. For example, information such as the frequency of words, etc. can be provided. A document/output post processing module 180 can include software which can prepare a result document in a particular form (e.g., a format requested by a user). It can also send result information to a 3rd party or internal application for additional formatting and processing. The system administration module 185 can include software which allows an administrator to manage the software and hardware. In one embodiment, individual modules can be implemented as software modules that can be connected (via their specific input interface) and their output can be routed to modules desired for further processing. All described modules can run on one or many CPUs, virtual machines, mainframes, or shells within the described information processing infrastructure.

The extraction module 150 includes software which can perform coding, learning, extraction and validation (discussed further with respect to FIGS. 2-8). Additional information generated by the extraction module 150 can be sent to the databases(s) 145 or to external inputs (e.g., input unit 130, communication unit 135, communication network 101, hard disk unit 120, and administration module 185). The output or part of the output of the extraction module 150 can be stored, presented or used as input parameters in various components (e.g., output unit 105, display unit 110, hard disk unit 120, memory unit 125, communication unit 135, communication network 101, conversion module 170, database(s) 145, OCR module 160, scanner 140, statistical analysis module 175) either using or not using the post-processing module 180. Such a feedback system can allow for iterative refinement.

Figure 2:
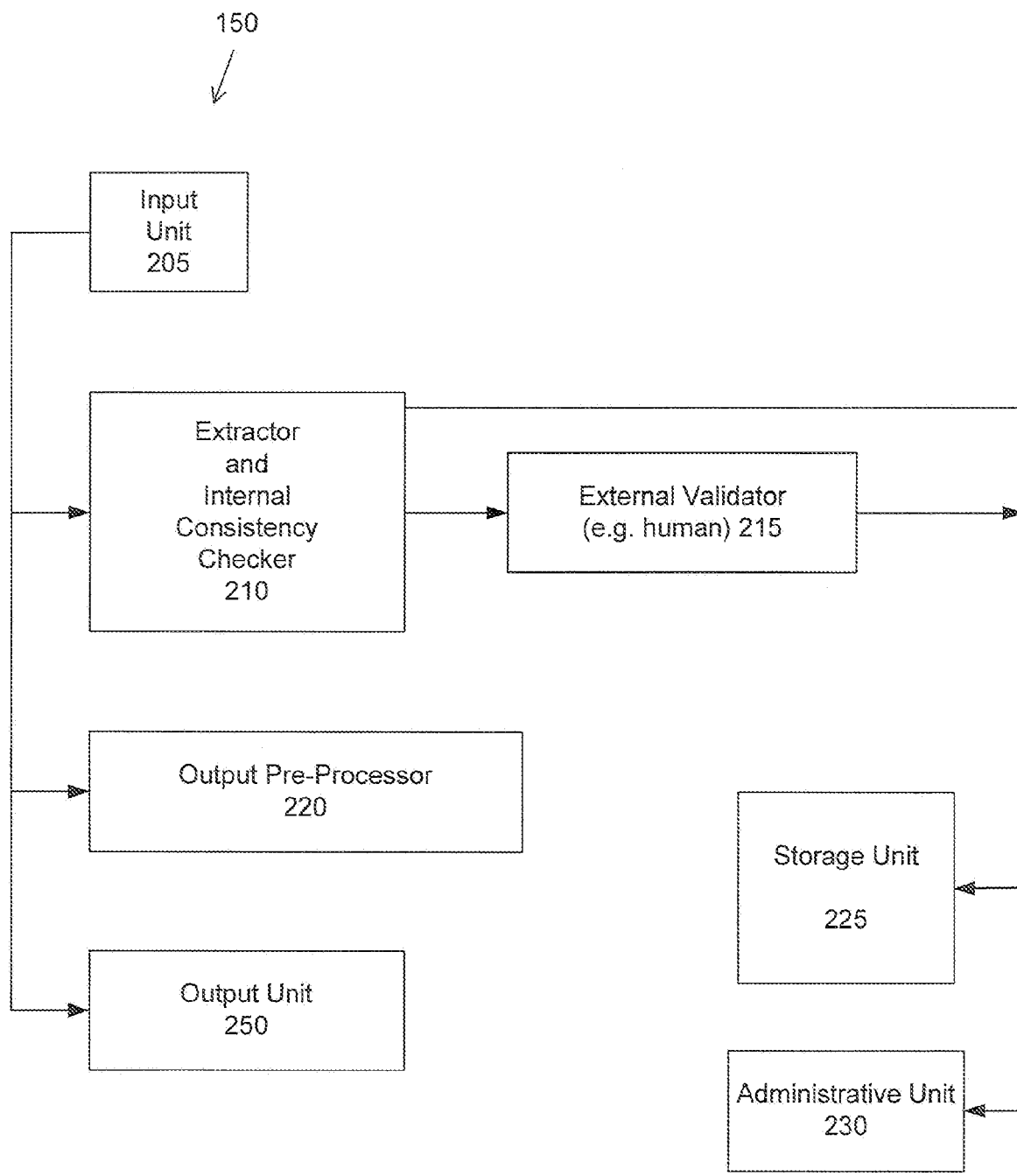
FIG. 2 illustrates details of the extraction module, according to one embodiment.

FIG. 2 illustrates details of the extraction module 150, according to one embodiment. The extraction module 150 can comprise an input unit 205 that handles all types of input. Such input includes, but is not limited to, invoices, remittance statements, bills of lading, checks, voting bills, forms, diagrams, printed tabular information, or certificates, or any combination thereof. Document representations can include different file formats as well as different document instances (e.g. images and textual information). The input unit 205 can be used as a connector to the data provided by other input-generating units (input unit 130, scanner 140, OCR module 160, document conversion module 170, database(s) 145, and document input module 165). The extraction module 150 can also comprise an extractor and internal consistency checker 210 which can extract information from the input and check the extracted information to determine if it is accurate. Such a check can be, but is not limited to: the validation of business rules, a comparison of tax rates and stated taxes to see if they match the total, checksums of invoice numbers, or cross referencing with a learned set stored in a database, or any combination thereof. Note that, in one embodiment, the extractor can be separate from the internal consistency checker. The extractor and internal consistency checker 210 may interchange information with an external validator 215. The external validator 215 can override, correct and approve information (retrieved as well as extracted or generated) within the system. The external validator 215 can be a human decision or information from other sources (e.g., software, stored information). The extractor and internal consistency checker 210 and the external validator 215 can be connected to a storage unit 225 (e.g., memory, file, database), which can store all of the information found by the extractor and internal consistency checker 210 and the external validator 215. Information from external validator 215 includes, but is not limited to: correction of an OCR-error within the textual representation of a document, a manual rotation of a document image, a change in the processing document language, or an adaptation of any parameter used within the system, or any combination thereof.

Some or all elements of the extraction module 150 can be managed by an administrative unit 230. Note that all modules can have their own administration module, which can all be called by the administration module 185, which can also manage the infrastructure and connections within the hardware and software network outlined in extraction system 100 of FIG. 1. The output can be preprocessed by an output preprocessor 220 and sent to an output unit 250. Output preprocessing, output, storage and administration can enable the extraction module 150 to interact with its environment and can allow storage and/or retrieval of internal states of document analysis. The internal states can include various information about documents, such as, but are not limited to: learned information; extracted statistics; gathered keywords (e.g., a character, letter, symbol, phrase, digit, or a compilation or string thereof, on a document containing information about a neighboring field value, such as: "check amount" in a remittance statement, "ship to" address in a bill of lading, "invoice number" in an invoice, "author" in a contract, "part number" in a sales order, "patient name" in a medical claim or explanation of benefits, etc.), N-gram features (i.e., information related to N-grams of textual surroundings of a target, field; N-grams are described in more detail below); image-particles (see target codecs module 310 in FIG. 3 for further explanation); parameters; or datasets (e.g., containing one or many input documents, imported document-sets as positive or negative examples, dictionaries and derivatives thereof, which can include statistics related to N-gram features); or any combination thereof.

N-grams are sub-sequences of items. N-grams can provide information about textual surrounding items of a target field. The items in question can be phonemes, syllables, letters, words, base pairs, etc., according to the application. N-gram models can be used in statistical natural language processing. For a sequence of words (e.g., the cat smelled like), the trigrams (i.e., 3-grams) would be: "# the cat", "the cat smelled", and "cat smelled like". For sequences of characters (e.g., smelled), the trigrams would be: sme, mel, ell, lle, and led. Note that spaces, punctuation, etc. can be reduced or removed from the N-grams by preprocessing. N-gram type options include delta-grams that code the relative changes between sequential N-gram particles. In addition, different types of preprocessing can be selected, including, but not limited to: no preprocessing, "word-merging" (e.g., correcting OCR-split text fragments and merging them), other OCR-error character exchange (e.g. such as a conversion from "0" to "O" or "l" to "1", based on a confusion matrix), removal of insignificant characters, or conversion to lower or upper case, or any combination thereof.

Figure 3:
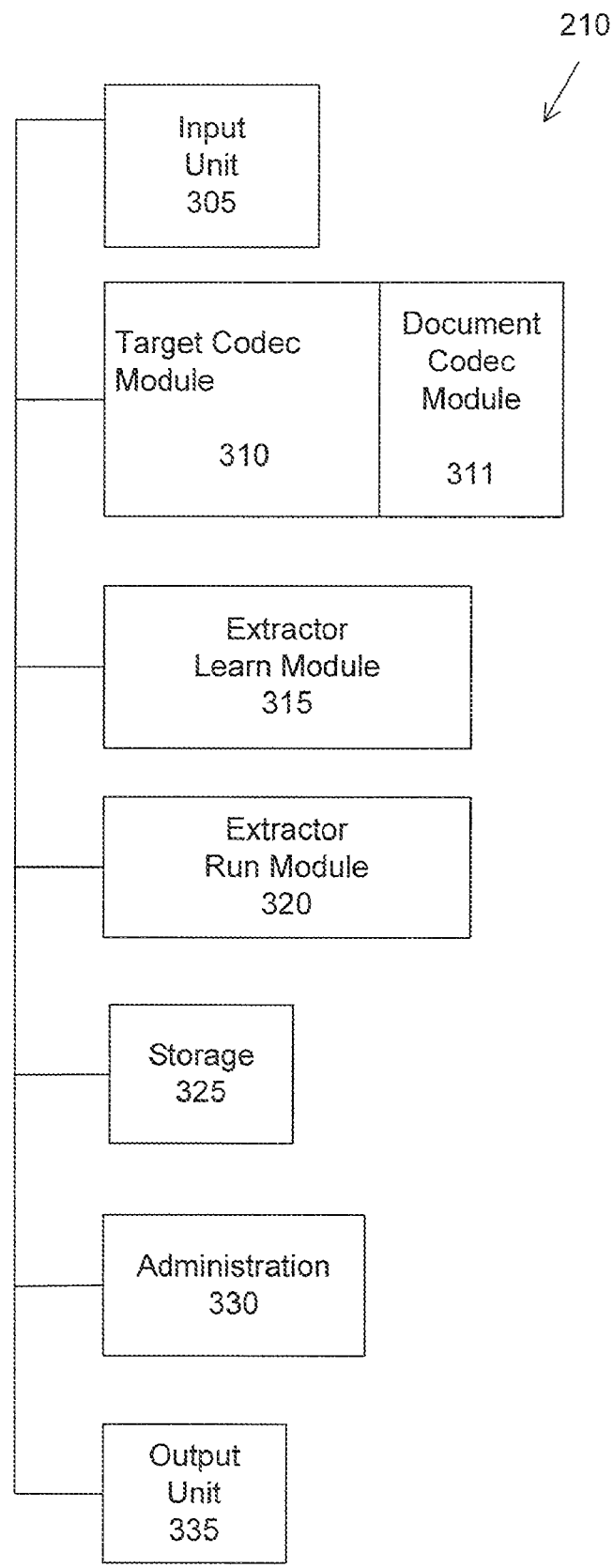
FIG. 3 illustrates details of the extractor portion of the extractor and internal consistency checker 210, according to one embodiment.

FIG. 3 illustrates details of the extractor portion of the extractor and internal consistency checker 210, according to one embodiment. Input unit 305 accepts input (e.g., document(s)) into a target codec module 310, which can use 1 to N instances of target (i.e., feature) codecs (i.e., coder/decoders) to extract information about content, context, position and other representations related to the targets in the document(s). This extracted information can include, but is not limited to: statistics related to N-gram features, graphical features that can anchor targets (e.g., a logo that has a position relative to the address of the customer), or validation rules for content (e.g., a number that contains its own checksum and is of a specific format), or any combination thereof.

The input unit 305 can collect all document formats from other inputs and adapt them for the target codec module 310. The target codec module 310 is described in more detail in FIG. 4 and its accompanying description. The document codec module 311 contains the representation (as one or many feature sets) of a full document(s) (which can consist of many pages, and have different aspects, such as combinations of graphics and textual information), while the target codec module 310 can process subsets of the document (which can be a page, chapter, paragraph, line, word, etc.).

The extractor learn module 315 can train the system. The extractor learn module 315 can be provided with a document(s) and information about which targets should be extracted. Such a learnset can comprise a cross section of different document types to be processed and can include a few documents or hundreds of documents. For example, when the field "total amount" on an invoice is desired as an extraction target, the value and the position of the field on the document can be provided to the extraction learn module 315 and it will rank and generalize from the given examples features that are typically associated with that field. For example, the "total amount" from invoices can be located by finding the features such as N-gram features of the word "total" and "gross", or the extraction of a date by using the relative position from a logo and the typical date format (e.g., 12 Jan. 2005). The statistics of these correlations are then processed and stored as part of the learning process. The extractor learn module 315 is described in more detail in FIG. 5 and its accompanying description.

The extractor run module 320 can run the system after training. Then, the learned information (acquired, processed and stored by extractor learn module 315) can be retrieved and used to locate targets on new documents. The extractor run model 320 is described in more detail in FIG. 6 and its accompanying description. The input unit 305, storage 325, administration 330, and output unit 335 perform functions similar to those described in FIG. 2. The storage unit 325 can store only information relevant to the module it accompanies, the extractor and internal consistency checker 210. This holds true for the other storage units in the figures. The realization of the storage units can be physically different, but might also be contained in different (and protected) logical units. The output unit 335 can send the output to all modules that can process it and also to the output unit 105, where all possible output can be sent. The output unit 105 can monitor (e.g., follow, supervise) all processing.

Figure 4:
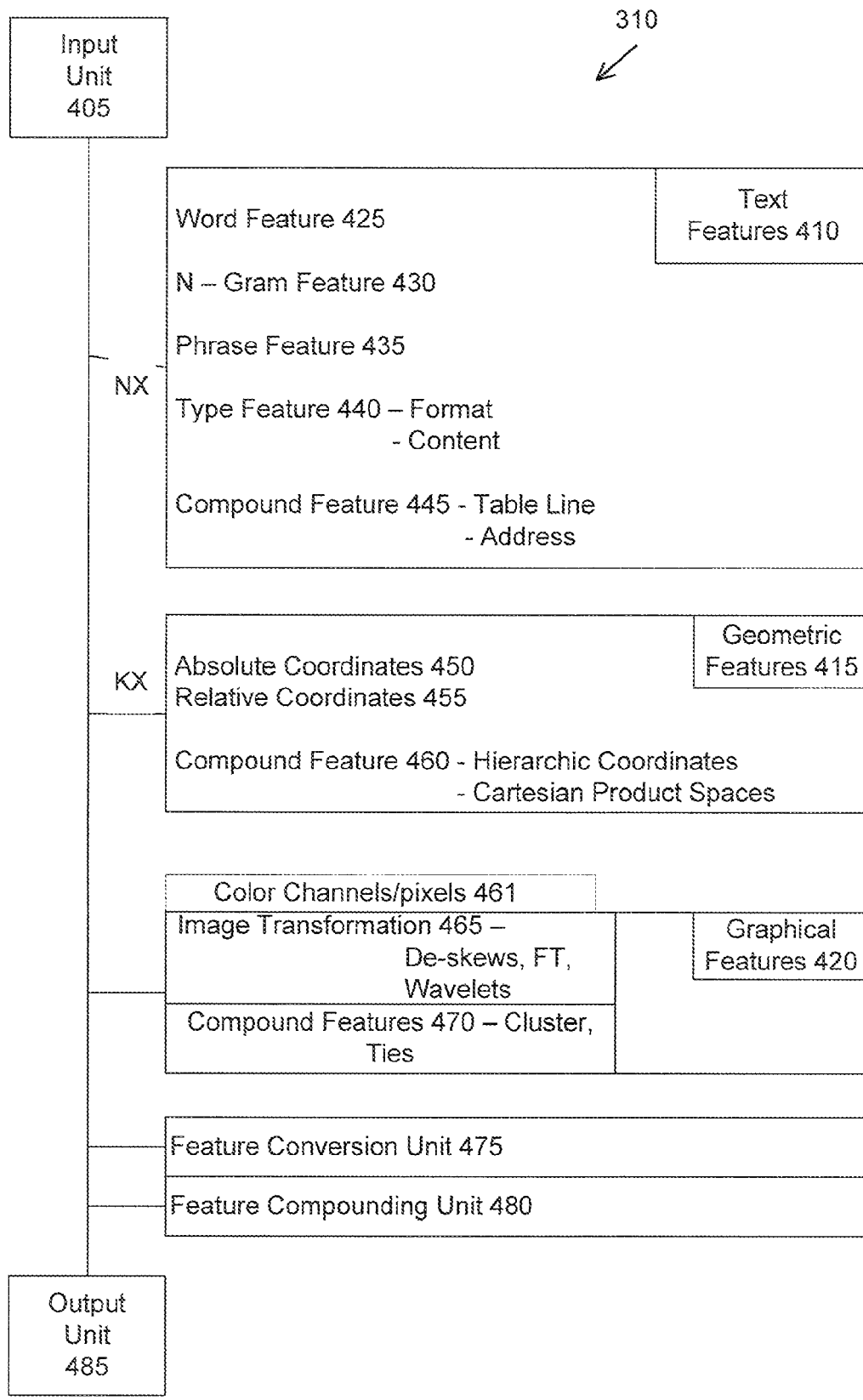
FIG. 4 illustrates details of the target codec module, according to one embodiment.

FIG. 4 illustrates details of the target codec module 310, according to one embodiment. Documents can be input in the input unit 405. Input unit 405 can allow only input suited for the target codec module 310, and can differ in this aspect from input units 130, 205 and 305. Information on the inputted documents can comprise features including, but not limited to: text features 410, geometric features 415, or graphical features 420, or any combination thereof. The text features 410 can be word features 425 (e.g., "date"), N-gram features 430 (e.g., BRA RAI AIN for tri-grams for the word Brain), phrase features 435 (e.g., "Invoice date"), type features 440, or compound features 445. The type feature 440 can include format types and content types. Format types, can include, but are not limited to, equivalent representations of regular expressions, such as NN-NNAAA, where N represents a Number and A represents an alphanumerical character. For example, an invoice number 08-04A6K can code the Year (08), Month (04) and an alphanumeric part for individual invoice identification. Content types can include, but are not limited to, construction or checking rules that apply to the International Bank Account Number (IBAN) system. For example, DE90123456780023434566 can represent a German Bank account with the bank ID number 12345678 and the account number 2343566. The IBAN coding can contain checksum and validation rules as well as a specific format. Compound features 445 can also be constructed. For example, a combination of an N-gram list with a format type, such as _D, _DA, DAT, ATE . . . with NN/NN/200N can be constructed. In one embodiment, the N could be restricted to allow only numbers reasonable for the position (e.g., 0 or 1 for the first digit of the month position).

The geometric features 415 can include: absolute coordinates 450, relative coordinates 455, or compound features 460, or any combination thereof. The absolute coordinates 450 can be coordinates positioned in a specific document particle (i.e., any cluster of one or many features or feature combinations with respect to a target position). An example would be the phrase "Invoice Number" pointing 0.2 inches to the right and 5 inches down from the top left corner of the page for the invoice number field. Of course, the phrase can also be coded in N-Grams, etc. The relative coordinates 455 can be coordinates relative to other particles or other features. For example, the target could point 0.2 inches left and 2 inches down after the textual feature representation of the phrase "Tax Identification Number."

The compound features 460 can be a combination of absolute coordinates 450 and relative coordinates 455. For example, hierarchal coordinates (i.e., relative coordinates 455) and Cartesian product spaces (i.e., absolute coordinates 450) can be used. Hierarchal coordinates can be sets of hierarchies of positional vectors reflecting the spatial relationship between fields. For example, for an invoice, the total amount field could be in relative proximity to the tax, freight, subtotal fields as opposed to the "bill to" address field. Such hierarchies can be unique, can contain multiple options and the coordinates can be noted in absolute and/or relative coordinates. Cartesian product spaces can specify the location of a target on a document by two numerical coordinates. Higher-dimensional feature spaces can also be constructed with the aim of easier classification/learning therein. The Cartesian product (or product set) is a direct product of sets. The Cartesian product of sets X (e.g., the points on an x-axis) and Y (e.g., the points on a y-axis) is the set of all possible ordered pairs whose first component is a member of X and whose second component is a member of Y (e.g., the whole of the x-y plane). A Cartesian product of two finite sets can be represented by a table, with one set as the rows and the other as the columns, and forming the ordered pairs (e.g., the cells of the table), by choosing the elements of the set from the row and the column. It is possible to define the Cartesian product of an arbitrary (possibly infinite) family of sets.

The graphical features 420 can include: color channels and/or pixels 461, image transformations 465, or compound features 470, or any combination thereof. The color channels and/or pixels 461 can include certain colors, such as (but not limited to): Red, Green, Blue and all mixtures in all color depth. For example, when the "amount due" is printed in red this color information can be used to retrieve the "amount due" target. The image transformations 465 can include de-skews, Fourier-Transforms (FT), and wavelets. De-skewing of an image may correct for shifts in the coordinates extracted due to bad alignment of the document in the scanner. Furthermore, Fourier Transformations and wavelets can be used to filter out noise (e.g., high frequency) background in bad quality scans or prints, to filter out pictures or watermarks and the like, or to code repetitive structures in the document (e.g., a highly structured table with a quasi-crystalline structure). The compound features 470 can include pixel clusters and/or frequency bands. Information about an image transformation (e.g., watermark) starting after a pixel cluster (e.g., clearcut logo) could be coded in this way.

The feature conversion unit 475 can allow for changing one feature representation into another. In one embodiment, the N-grams can be calculated based on a phrase or word feature and vice versa. For example, the word "brain" can be coded as bi-grams (_b, br, ra, ai, in, n_) and given this it can be again joined together to spell out "brain" when the order of the appearance of the bi-grams is stored along with the bi-gram. As another example, when a phrase feature is used (e.g., "Invoice Number") it can be split into two word features (e.g., "Invoice" and "Number") and then be combined again. The feature compounding unit 480 can be used to build packages containing different feature-sets (e.g., a text feature combined with geometrical features). For example, it can be indicated that the text feature "date" is found at the geometrical feature coordinates 625×871.

The output unit 485 can take the output of the target codec module 310 and pass the information to another element of the extraction system 100. For example, the coded package for a phrase and coordinates can be routed to the extraction learn module 319 where it can be combined with other information. As another example, the extraction run module 320 can be compared with the learned sets and can influence the candidate ranking system.

Figure 5:
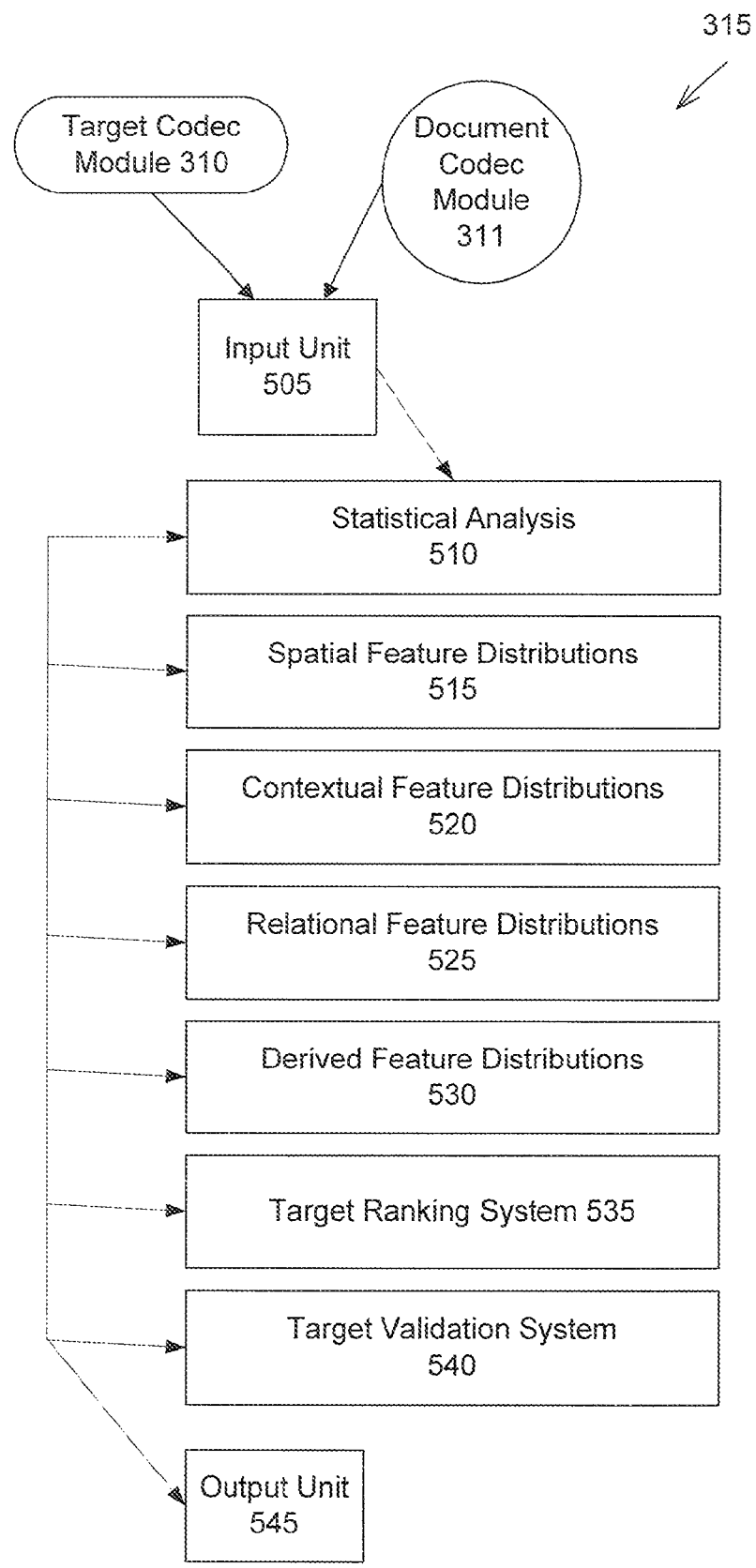
FIG. 5 illustrates details of the extractor learn module, according to one embodiment.

FIG. 5 illustrates details of the extractor learn module 315, according to one embodiment. The extractor learn module 315 is used for training the system. The extractor learn module 315 can then be provided with documents and information about which targets should be extracted from the documents. For example, when the field "total amount" is desired as extraction target, the value and the position of the field on the document (e.g., the page number and its absolute position) can be provided to the extractor learn module 315, which will rank and generalize from the given examples characters and correlations that are typically associated with the "total amount" target. The statistics of these characteristics and correlations can then be processed and stored as the learning process. The extraction learn module 315 can set the ground for further extraction (i.e., the extraction run module 320) and the collected information, statistics, and positive and negative examples can then be used as the basis for the ranking of the candidates (e.g., see 725 of FIG. 7 and 825 of FIG. 8).

The extractor learn module 315 can receive input in the input unit 505 from the target codec module 310 and the document codec module 311. The combination of these inputs from the target codec information (what and where, provided by the target codec module 310) with the document codec information (in which context, provided by the target codec module 310) or the document codec module 311 can be used for the learning process. For example, a target value, positions, and the document where it is embedded in may be needed to learn the surrounding contextual information and to allow for generalization over many documents.

The input unit 505 can accept only valid input for the extractor learn module 315 and can thus be different from input units 130, 205, 305 and 405. The target codec information and the document codec information can have the same codec scheme, because a comparison between, for example, N-Grams and Pixel-Clusters may otherwise not result in clear matches. Once the input is entered, any combination of the following can be used for the learning: statistical analysis module 510, spatial feature distributions module 515, contextual feature distributions module 520, relational feature distributions module 525, derived feature distributions module 530, a target ranking system 535, and/or a target validation system 540. These different learning modules can cover different aspects of the underlying data and its distributions. The different learning modules may have different strength and weaknesses. Thus, the application of a specific learning module or the combination of many learning methods may result in higher extraction performance.

The statistical analysis module 510 can contribute to focusing on the most important features, which can be either the most prominent features or the least typical feature sets, depending on the task. The statistical analysis module 510 is based on N-grams and allows for Bayesian methods, such as Bayesian inference or Bayesian networks.

The spatial feature distributions module 515 can contribute to the localization of the targets and thus can be used to reduce the extraction problem to areas where the target is most likely to be found. The contextual feature distributions module 520 can represent one or many anchors surrounding the target, and, irrespective of their coordinates on the document, can weigh the information about targets or possible targets in the neighborhood of the current target. Thus, targets with highly variable localization over documents can be found. The relational feature distributions 525 can point towards areas/regions/feature sets where and within which the target may be found (e.g., top-left corner of the $2^{nd}$ page shows the date the document was printed). Furthermore, the relational feature distribution 525 can gather information from the local or global relations between different targets, target positions or other positions. Derived feature distributions module 530 can be generated by mathematical transformations between the other learning modules. Thus, for example, the derived feature distribution module 530 can calculate and combine deduced distribution from the statistical analysis 510, spatial features distributions 515, contextual feature distributions 520, relational feature distributions 525, or target ranking system 535, or any combination thereof.

The target validation system 540 can check internally for the validity of the candidates across the fields and the document. At this point positive or negative counter-examples can be obtained for a second level ranking. The target validation system 540 can provide good information about the likelihood of a candidate for a target. For example, it is unlikely to find another number that meets a specific checksum within the same document. Based on this validation information, weaker negative features can be weighted less and/or positive features can be weighted more.

The output unit 545 can take the output of the extractor learn module 315 and pass the information to another element of the extraction system 100. For example, the ranked list can be stored, printed, visualized, sent to a database, integrated into the learn sets, sent to other applications, or sent to the output post processing module, or any combination thereof.

Figure 6:
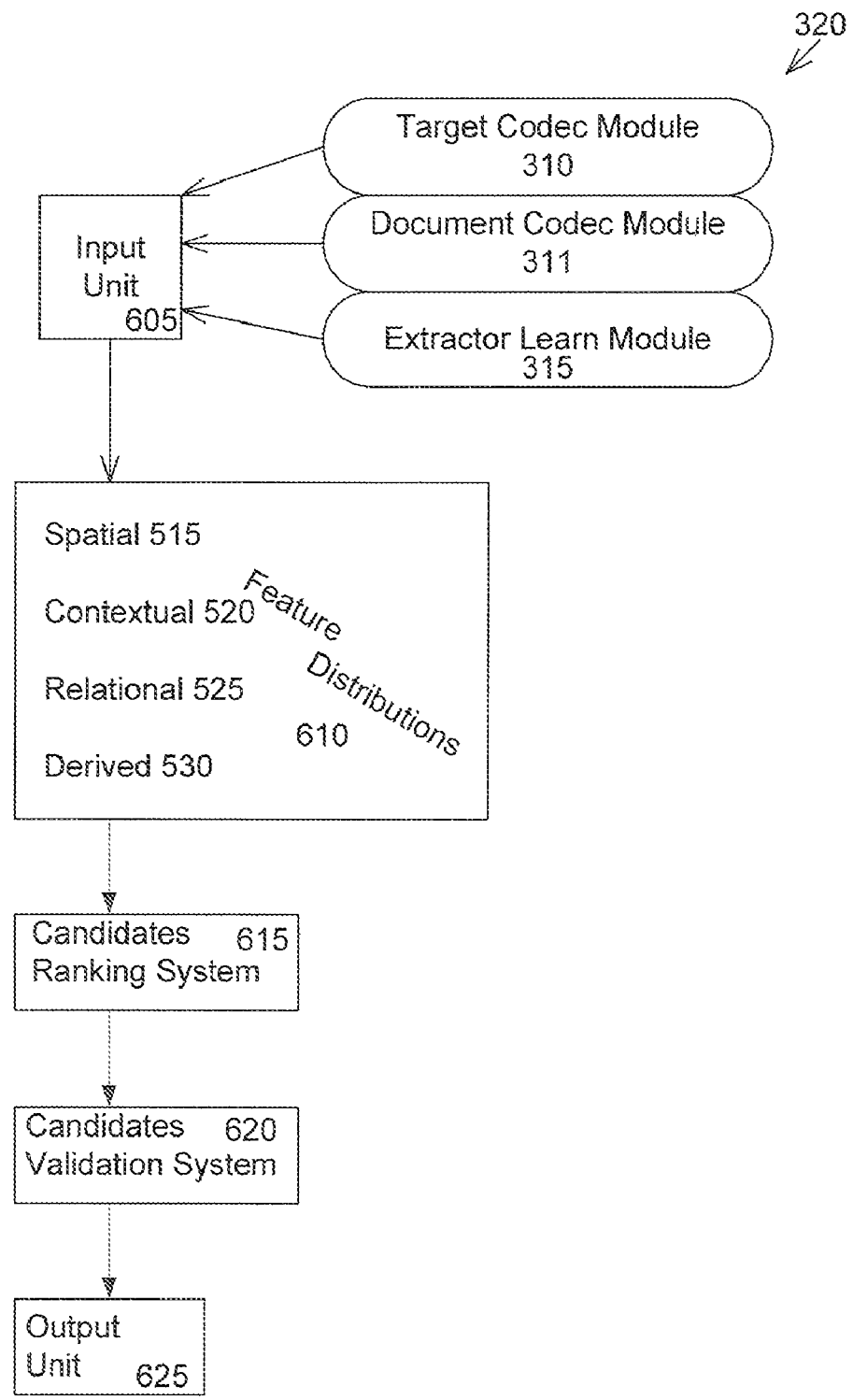
FIG. 6 illustrates details of the extractor run module, according to one embodiment.

FIG. 6 illustrates details of the extractor run module 320, according to one embodiment. Input can be fed into the input unit 605 from the target codec module 310, the document codec module 311 and the extractor learn module 315. The feature distributions 610 (spatial feature distributions 515, contextual feature distributions 520, relational feature distributions 525, and derived feature distributions 530) and the target ranking system 535 can be applied. All the information can then be collapsed into a candidate ranking system 615 that orders the candidates from a new document according to the information learned earlier. Within candidate ranking system 615, a score can be obtained that sorts the candidates for a field according to likelihood. This score can be directly based on the learned information, by mathematical combination, and/or by weighting. For example, a candidate for a target can be ranked higher if two or more features are expressed well for the candidate compared to one or no matching features. This candidate ranking system 615 can differ from the target ranking system 535 in that the candidate ranking system 615 can use many feature modalities and many targets for the ranking. For example, in some embodiments, a candidate can't be valid for two non-identical fields and thus, already-set candidates can be removed from a candidate list. This can be relevant in the context of OCR errors and weak format definitions within the documents. For example, Oct. 3, 2005 could be a date, or it could also be an invoice number with an OCR error (e.g., that should read 10703/05). In such cases, candidate filtering across target field candidate sets can be valuable. A ranked set (ranging from 1 to many) of candidates, created as outlined before, can include probability scores that can be passed to a candidate validation system 620. The candidate validation system 620 can route the results, for example, to a human verifier or a database. The output of the extractor run module 320 can then be fed back into the extraction module 150 (FIG. 1) that can be fed into the main system 100, and reused, for example, for presenting the results and/or for incremental learning and adaptation of the extraction module 150.

Figure 7:
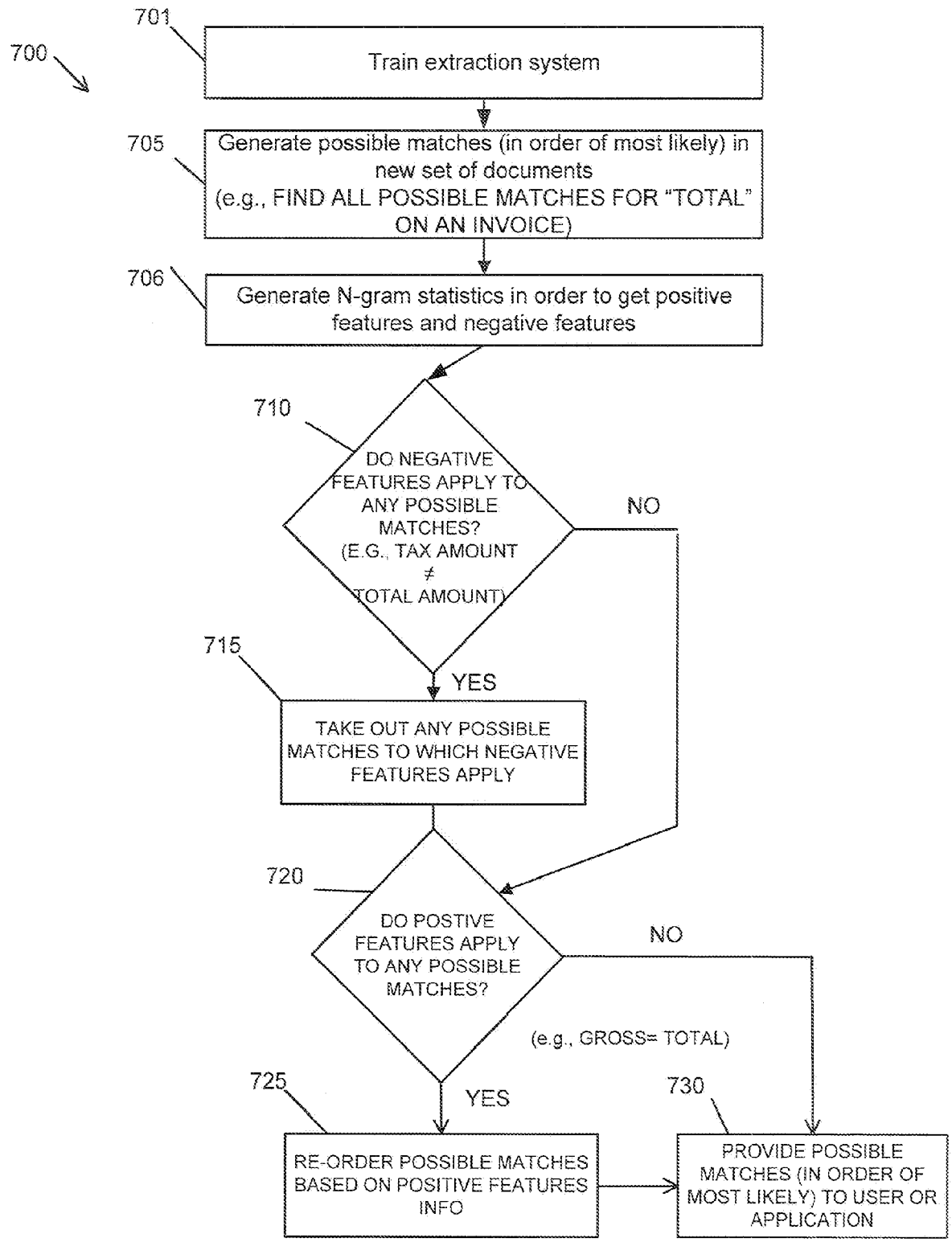
FIG. 7 illustrates a method of the extraction module, according to one embodiment.

FIG. 7 illustrates a method 700 of the extraction module 150, according to one embodiment. In 701, the extractor learn module 315 is run on a set of documents in order to train the extraction system 100, as explained in more detail with respect to FIGS. 3 and 5 above. In 705, the extractor run module 320 is executed and possible matches (i.e., candidates) for a target entry on a document (e.g., total amount on an invoice) can be generated and ranked according to likelihood. As described above, the extractor run module 320 can perform this function, as described in FIG. 6.

The compilation of the possible match candidate list can be executed separately and successively for every target field to be extracted. To create the candidate lists for given fields, the word pool (see document codec module 311) can be scanned serially, entry by entry, and every string and every sub-string (or other features and feature subsets, as outlined in a feature-codec unit) can be inspected.

An attribute score and localization score for each possible candidate for each target can be determined using the spatial feature distributions module 515, the contextual feature distributions module 520, the relational feature distributions module 525, or the derived feature distributions 530, or any combination thereof. An attribute score can be based on criteria dealing with length and format of text and/or pattern properties of a field (i.e., similar to what is used in regular expression). Examples of attributes are the length, format, pattern, or character of the following fields:

Field "invoice number"='000056', or 'x3456' or '19543567'...

Field "invoice date"='Jan. 14, 2003' or 'Sep. 22, 2001' or 'Dec. 11, 1999'

Field "total amount"='1,176.22' or '$170.00' or '699.28'.

One example of a format attribute score calculation is detailed below for a learned format "$ +ddd.dd". When this is evaluated with the given text on the document, "$ #123.45/" (containing OCR-errors), the scoring counts seven format hits weighted at two each (being the $ sign, the decimal point, and five digits), and it counts one mismatch weighted at one (# vs. +), and one additional character at the end weighted at one (e.g., /). The total attribute score might be a weighted sum or linear combination (e.g., 7(2)−1(1)−1(1)=12) of those parts, where the weights depend on the statistics of all other format strings learned for the present field type. Note that the weights can change depending on the field type.

A localization score can be based on criteria dealing with the X, Y distribution of fields or features. Examples of localization are:

Field "invoice number" is located mainly at upper right of the first page

Field "invoice date" is located mainly at upper right of the first page

Field "total amount" is located mainly at the foot of the last page (on the right)

Those fragments which score maximum points for the spatial, contextual, relational and derived criteria can be picked up as candidates and can be scored accordingly. The maximum number of candidates and extent of strictness of the criteria can be adapted by adjustable parameters. An example of a localization score calculation can be the weighted linear integration (based on learnset statistics such as variances) for the X and Y coordinates for a given field. For example, in an invoice document printed in portfolio (e.g., 8 inches on the top of the paper and 11 inches on the side of the paper), the Y coordinates can show higher variance (e.g., the "total amount field" can be located in many positions on the Y axis in different invoice documents) and can thus be weighted less compared to the X position, because the X position can show more stability in this example (e.g., the "total amount field" would often be located in similar positions on the X axis).

It should be noted that if the training set of documents consists of roughly similar documents, the spatial, contextual, relational and derived criteria have to be stronger so that the number of candidates can be reduced. If the training set of documents consists of different documents, the attribute and localization tolerances can be milder so that the number of candidates can be increased.

The attribute score information and localization score information can be used to generate the possible match candidate list for each target field. In addition, the attribute score information and localization score information can remain "attached" to each candidate (e.g., during a second searching phase, ranking phase, which is described in more detail below).

In 706, after the possible match candidate list has been generated in 705, statistics related to the N-grams (with or without statistical weighting, which is described in more detail below) can be determined, and a positive features list and a negative features list can be created for each target. This can be done by interplay of the extractor learn module 315 and the extractor run module 320 with the text features 410, the statistical analysis 510 and/or feature distributions 515, 520, 525, 530. For example, during the learning phase, run by the extractor learn module 315, positive features (e.g., "Oct. 25, 2002" is found near the field "DATE") can be collected. When during the run phase, using the extractor run module 320, one candidate with a high score (and thus, a very high likelihood that it is the desired field), is found, the system can automatically generate a negative feature list based on the complement of the features in the document and the feature considered as "good" or "positive" from the learn set (e.g., "Number" can be added to the negative feature list for the order number field, as it is a conflicting word, because it appears in both "Invoice Number" and "Order Number"). This procedure can result in a contrasted and weighted list of positive and negative features. Note that this process can also be applied in the learning phase.

Figure 9:
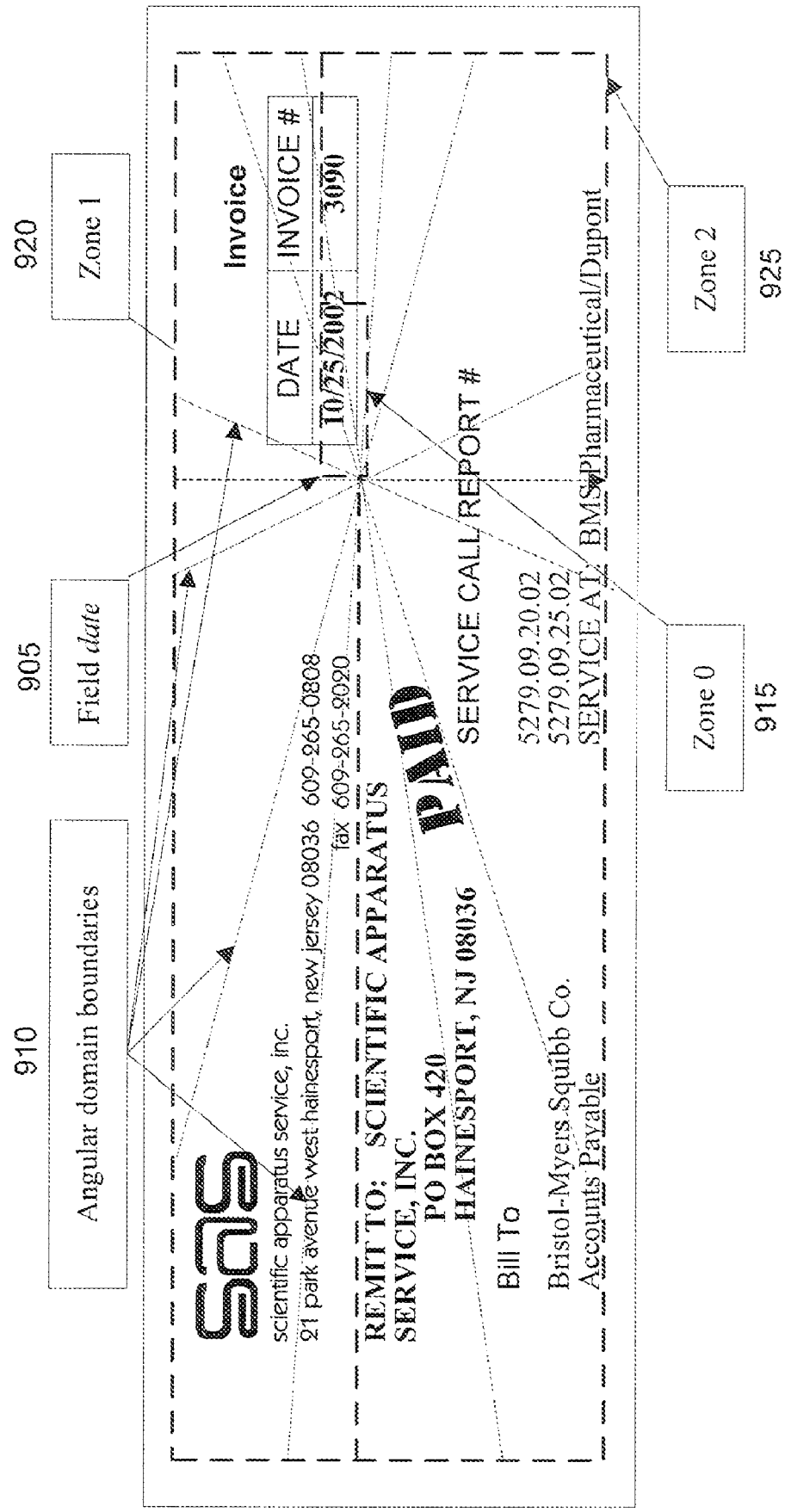
FIG. 9 illustrates the spread and resolution for one example document of spatial sampling of N-gram/word/positive or negative example statistics of surrounding words (or other text particles) for the field "date", according to one embodiment.

N-gram statistics (aka: "N-gram frequency histogram" or "N-gram frequency profile") can be created for words in the vicinity of every field. FIG. 9 illustrates the spread and resolution for one example document of spatial sampling of N-gram/word/positive or negative example statistics of surrounding words (or other text particles) for the field "date", according to one embodiment. The field "date" 905 is marked by a box. The angular boundary domains, as they related to the field "date" 905 are shown for a resolution of 12 angles, breaking the document into various sections represented by the small dashed lines 910.

The rough zones 915, 920 and 925 are shown to illustrate another manner of breaking up the document into sections in order to illustrate spatial domains related to the field "date". For example, zone 1 (920) is represented by the large dashed lines that create a section to the left and above the characters "Oct. 25, 2002". Similarly, zone 2 (925) is represented by the large dashed lines that create a section below the characters "Oct. 25, 2002". And zone 0 (915) is represented by large dashed lines that create a section surrounding the characters "Oct. 25, 2002".

The angular boundary domains 910 and the spatial domains 915, 920, and 925 can be used to learn and apply what information is generally found relative to the field of interest. For example, in FIG. 9, applying these boundaries, it can be learned that the name of the company is positionally related to the date field 905 (e.g., Oct. 25, 2002) by being over to the left and upwards of the date field 905. In addition, it can be learned that the word "Invoice" is in zone 1 (920). When searching for the date field in another invoice, this information can be applied to help determine if a candidate for the date field is correct, as similar positional relationships would likely apply.

In one embodiment, documents can be read word by word, and the text can be parsed into a set of overlapping N-grams. For example: "Number 123"={_N, _Nu, _Num, Numb, umbe, mber, ber_, er_, r_, _1, _12, _123, 123_, 23_, 3}. At the same time, in one embodiment, characters can be mapped into reduced character sets (e.g., all characters become uppercase letters and/or all digits can be represented by "0". "Number 123"={_N, _NU, _NUM, NUMB, UMBE, MBER, BER_, ER_, R_, _0, _00, _000, 000_, 00_, 0_}. In addition, letters which have similar shapes can become equal: β=B, Ä=A, etc.). Every N-gram can then be associated with an integer number in a certain range (0—TABLE_SIZE), where the parameter TABLE_SIZE is the length of the spectrum (e.g., approximately 8000).

For each field, the N-gram spectrum starts as an empty array of TABLE_SIZE floating point accumulators: class_pss [TABLE_SIZE]. During the training, the total weighted score for every N-gram number (Ingr) is accumulated in a corresponding accumulator class_pss[Ingr], providing an N-gram spectrum of the surrounding words. The statistics in such a "weighed" spectrum represent not only occurrence frequencies of the N-grams but also the average adjacency of every N-gram to the corresponding field in the document. The specific functional dependence between an N-gram weight and its position relative to the field can be given by an adjustable place function. The closer a word is to the field, the larger the weight of the corresponding N-gram. The statistics take the distance and mutual positioning for every field N-gram pair into account. For example, North and West-located N-grams usually have more weight than South or East-located N-grams. Angular distribution of N-gram weights can be, for example, anisotropic: for all different intermediate directions–14 angular domain N-gram statistics can be collected separately. See FIG. 9 for an example of spatial sampling.

For example, the field "invoice number" can be mainly surrounded by N-grams belonging to relevant keywords, like such as "Invoice", "No.", "Date", 'INVO', 'VOIC', 'NO._', 'NUMB', 'DATE' to the North, to the Northwest or to the West, but seldom surrounded by such N-gram belonging to irrelevant keywords such a "total", "order" "P.O. Nr": 'TOTA', 'ORDE', 'RDER', 'P.O.', etc.

The field "total amount" can be mainly surrounded by N-gram belonging to relevant keywords: 'TOTA', 'MOUN', 'DUE_', 'TAX_', 'NET_' to the North, to the Northwest, or to the West, but seldom surrounded by N-gram belonging to irrelevant keywords: 'NN/N' (where N are numbers in date field), 'INVO', 'NUMB', 'P.O.', etc.

In one embodiment, the N-gram statistics are not calculated for each document fragment (as it can be for the attribute score and localization score) if it would take too long. Instead, the N-gram statistics can be calculated for candidates only during a ranking phase. Thus, in one embodiment, the list of sorted candidates in 705 can be created with just the attribute and localization scores. The final more correct result can be achieved after the ranking phase in 706, when the N-gram statistics are used.

In one embodiment, during the training, two N-gram lists are created and ranked for every field: a positive features list (for surrounding N-grams which appear in the vicinity of the corresponding field more often than the average) and a negative features list (for surrounding N-grams which appear less than the average). Every N-gram list consist of three spatial zone sub-lists: zone 1—for texts in close vicinity "before field"; zone 2—for texts in close vicinity "after field"; and zone 0—for texts in the field itself. N-gram representation has "fuzziness" in that it can reveal the real field location, even if the field itself or any neighborhood words are badly OCR corrupted. Fuzziness can be equally valid for training and extraction. Perfect OCR recognition is not required. In addition, using the two lists instead of a whole N-gram spectrum can provide faster score computing and can enable reduction of "noise effect" from neutral N-grams, which don't belong to either of the two lists and are unlikely to represent significant characteristics of the document field.

It should be noted that, in another embodiment, an N-gram vicinity score can be calculated, and can take into account statistical weighting characteristics, which include, but are not limited to: the difference between numerical and alphabetical N-grams (former ones are weighted less); the difference between one, two and three letter N-grams (short ones are weighted less); the two kinds of spatial mutual "screen" effects for "positive" and "neutral" N-grams (where "positive" N-grams belong to the positive features list, "negative" N-grams belong to the negative features list, and "neutral" N-grams don't belong to either the "positive" or "negative" N-grams list) (if there are a few equal "positive" N-grams in the field vicinity, only the nearest one of them contributes to the corresponding score; if there exist any "neutral" N-gram in the field vicinity, nearer then the nearest "positive" N-gram, then the score is reduced by some penalty for each "neutral" item); or the additional penalizing of N-grams which belong to the negative lists provided by second step training; or any combination thereof.

In one embodiment, the N-gram vicinity score can also take into account a keyword candidate pairing. This pairing provides for every candidate preferable "keywords". This way, ambiguous connections between one keyword and many candidates, when they are placed closely together, are excluded.

Thus, as set forth above, ranking can take into account an attribute score (ATTR), a localization score (LOC), and an N-gram vicinity score (NGR). Note that FIG. 7 illustrates the use of these scores. 706 illustrates the use of the N-gram vicinity score, and the possible matches are found in 705 using the attribute score and the localization score. In one embodiment this can be represented by geometry where every candidate can be represented by a point in a 3-dimensional space. In one embodiment, the ranking score (SCR) computation can be expressed as:

$$SCR=NGR+(k1*LOC)+(k2*ATTR) \qquad (1)$$

where k1 and k2 are two adjusting parameters that take into account the relative weights of the localization score(s) and the attribute score(s).

Note that attribute scores can comprise, for example, N-grams, format scores, word and dictionary based scores, OCR confidence scores, and other attributes listed in 310. The localization scores can comprise, for example, relative or absolute coordinates and other attributes as outlined in 310.

It should also be noted, that, in one embodiment, in the scoring formula (1), LOC can be of the form $\Sigma loc_n$, where the loc are the different localization features, such as those given in the spatial feature codec 415, and ATTR can be of the form $\Sigma attr_n$, where the attr are the different attributes, such as those given in 310. Note that different weights can be given to each of the different localization features and each of the different attributes.

Figure 8:
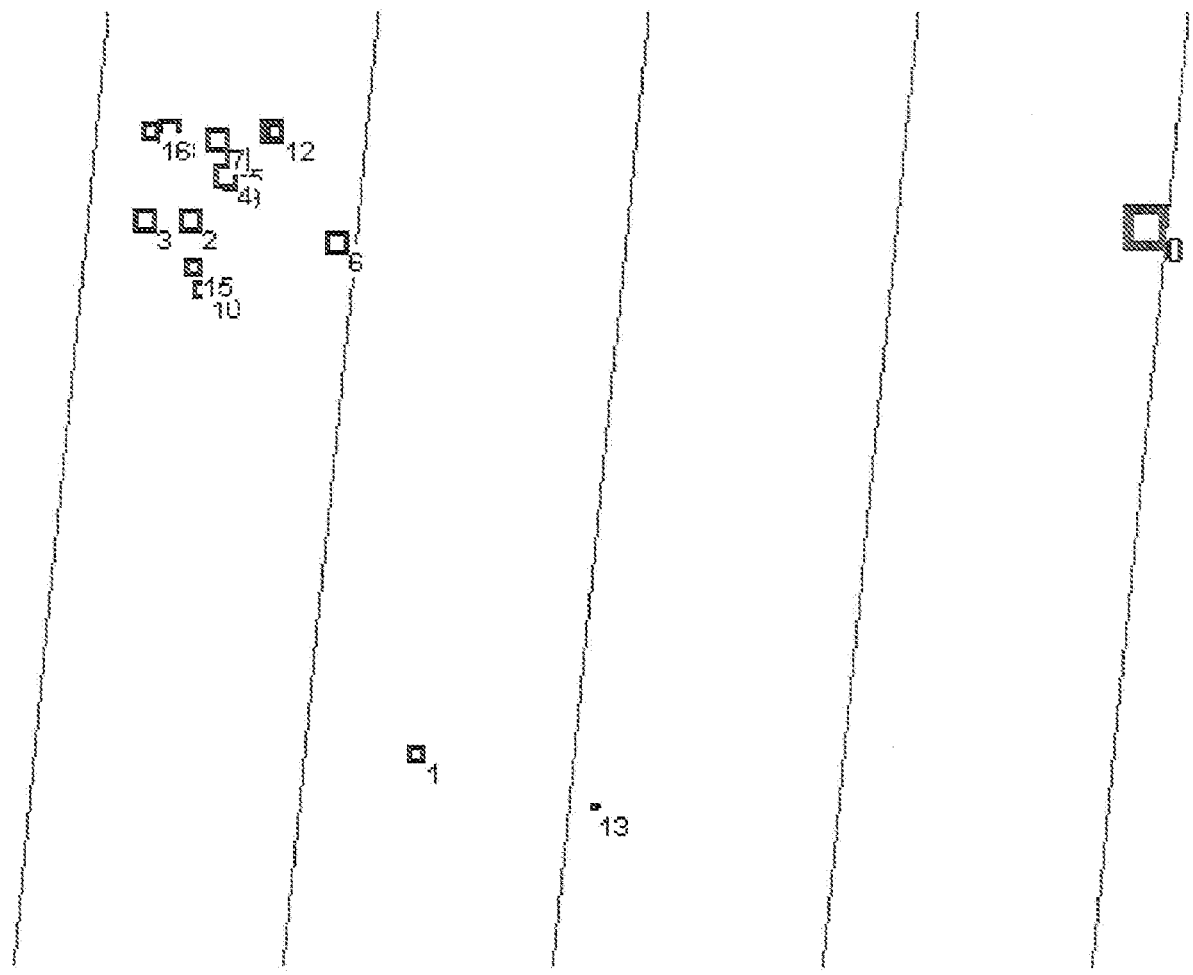
FIG. 8 illustrates a two-dimensional projection of the scores for a few candidates for one specific field, according to one embodiment.

It should be noted that k1 and k2 in formula (1) can be optimized for every field separately. FIG. 8 illustrates a two-dimensional projection of the scores for a few candidates for one specific field, according to one embodiment. It is clear that Candidate 0 in FIG. 8 is the best candidate by far, because it shows the highest score by far. In addition, manual inspection (e.g., by a person) can confirm that it is the correct (desired) target. Note that the horizontal line on FIG. 8 can represent the location score, the vertical line can represent the attribute score, and the horizontal lines can indicate sections of the hyper plane from the Bayes-Classifier, which indicates that the extraction and candidate sorting problem is solvable by a liner classifier, which generally indicates fast learning of any system, as well as high performance (e.g., at least regarding computational time and throughput).

In 710, it can be decided whether the negative features found by the N-gram statistics apply to the matches found in 705. For example, it could be determined whether a feature could be a forbidden or undesired word near the field to extract. For example, the word "tax" within a certain distance of a possible match "amount" could be defined as forbidden if the "total amount" is to be extracted. If there are negative features, the process proceeds to 715. If not, the process continues to 720. In 715, all possible matches in the candidate match list to which negative features apply can be taken out. In 720, the candidates are checked against a list of positive features also found by the N-gram statistics in 705. Positive features can be used to modify the probability of a feature being part of a candidate. Thus, positive features can increase or decrease the probability for representing the desired field of a given candidate or list of candidates. "Positive" features increase the probability and negative features decrease the candidate probability for representing the desired field. For example, the extraction system 100 can learn that "gross" is a positive counter-example for the term "total amount". If yes, there are some positive features, then in 725 the scores for the possible matches can be updated according to these counter-examples and the possible match list can be reordered based on the new score. This can be done by changing the scores of the candidates in the candidate list generated before and then resort to obtain an updated candidate list. The process can then move to 730. If there are no positive features, the process moves to 730, where the ranked possible match list is routed to the user or application. This generates a ordered list of candidates for a target field. Depending on the embodiment, one (the best) or more can be used as the extracted value. In the case of multiple candidates (e.g., three), the best three could be presented to a human verifier to choose from.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments.

In addition, it should be understood that the figures described above, which highlight the functionality and advantages of the present invention, are presented for example purposes only. The architecture of the present invention is sufficiently flexible and configurable, such that it may be utilized in ways other than that shown in the figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method for extracting information from at least one document in at least one set of documents, the method comprising:
generating, using at least one ranking and/or matching processor, at least one ranked possible match list comprising at least one possible match for at least one target entry on the at least one document, the at least one ranked possible match list based on at least one attribute score and at least one localization score;
determining, using at least one features processor, negative features and positive features based on N-gram statistics;
determining, using at least one negative features processor, whether negative features apply to the at least one possible match;
deleting, using at least one deleting processor, any possible match to which the negative feature applies from the at least one possible match list;
determining, using at least one positive features processor, whether any of the possible matches are positive features; and
re-ordering, using at least one re-ordering processor, the possible matches in the at least one possible match list based on the information learned from determining whether any of the possible matches are positive features.

2. The method of claim 1, wherein the at least one attribute score and the at least one localization score are based on:
spatial feature criteria;
contextual feature criteria;
relational feature criteria; or
derived feature criteria; or
any combination thereof.

3. The method of claim 2, wherein the spatial feature criteria is used to determine areas where the at least one target entry is most likely to be found.

4. The method of claim 2, wherein the contextual feature criteria weighs information about at least one possible target entry in the neighborhood of the at least one target entry.

5. The method of claim 2, wherein the relational feature criteria is used to determine at least one area where and within which the at least one target entry is likely to be found.

6. The method of claim 2, wherein the derived feature criteria is generated by mathematical transformations between any combination of the spatial feature criteria, the contextual feature criteria, and the relational feature criteria.

7. The method of claim 1, wherein at least one processor can comprise: the at least one ranking and/or matching processor, the at least one features processor, the at least one negative features processor, the at least one deleting processor, the at least one positive features processor, or the at least one re-ordering processor, or any combination thereof.

8. The method of claim 1, further comprising:
learning characteristics of the at least one set of documents from sample documents;
using the learned characteristics to find similar information in the at least one set of documents.

9. The method of claim 8, wherein the learned characteristics apply to at least one unknown document and/or at least one different document type.

10. The method of claim 1, further comprising:
validating information in the at least one document to determine if the information is consistent.

11. The method of claim 10, wherein the validating comprises internal validating and/or external validating.

12. The method of claim 1, wherein the ranked possible match list based on the at least one attribute score and the at least one localization score takes into account information related to:
text features;
geometric features;
graphic features;
feature conversion; or
any combination thereof.

13. A method for extracting information from at least one document in at least one set of documents, the method comprising:
    generating, using at least one ranking and/or matching processor, at least one ranked possible match list comprising at least one possible match for at least one target entry on the at least one document, the at least one ranked possible match list based on at least one attribute score and at least one localization score.

14. The method of claim 13, wherein the at least one attribute score and the at least one localization score are based on:
    spatial feature criteria;
    contextual feature criteria;
    relational feature criteria; or
    derived feature criteria; or
    any combination thereof.

15. The method of claim 14, wherein the spatial feature criteria is used to determine areas where the at least one target entry is most likely to be found.

16. The method of claim 14, wherein the contextual feature criteria weighs information about at least one possible target entry in the neighborhood of the at least one target entry.

17. The method of claim 14, wherein the relational feature criteria is used to determine at least one area where and within which the at least one target entry is likely to be found.

18. The method of claim 14, wherein the derived feature criteria is generated by mathematical transformations between any combination of the spatial feature criteria, the contextual feature criteria, and the relational feature criteria.

19. The method of claim 13, wherein at least one processor can comprise: the at least one ranking and/or matching processor, the at least one features processor, the at least one negative features processor, the at least one deleting processor, the at least one positive features processor, or the at least one re-ordering processor, or any combination thereof.

20. The method of claim 13, further comprising:
    learning characteristics of the at least one set of documents from sample documents;
    using the learned characteristics to find similar information in the at least one set of documents.

21. The method of claim 20, wherein the learned characteristics apply to at least one unknown document and/or at least one different document type.

22. The method of claim 13, further comprising:
    validating information in the at least one document to determine if the information is consistent.

23. The method of claim 22, wherein the validating comprises internal validating and/or external validating.

24. The method of claim 13, wherein the ranked possible match list based on the at least one attribute score and the at least one localization score takes into account information related to:
    text features;
    geometric features;
    graphic features;
    feature conversion; or
    any combination thereof.

25. A method for extracting information from at least one document in at least one set of documents, the method comprising:
    generating, using at least one ranking and/or matching processor, at least one ranked possible match list comprising at least one possible match for at least one target entry on the at least one document, the at least one ranked possible match list based on at least one attribute score and at least one localization score;
    determining, using at least one features processor, positive features based on N-gram statistics; and
    re-ordering, using at least one re-ordering processor, the possible matches in the at least one possible match list based on the information learned from determining whether any of the possible matches are positive features.

26. The method of claim 25, wherein the at least one attribute score and the at least one localization score are based on:
    spatial feature criteria;
    contextual feature criteria;
    relational feature criteria; or
    derived feature criteria; or
    any combination thereof.

27. The method of claim 26, wherein the spatial feature criteria is used to determine areas where the at least one target entry is most likely to be found.

28. The method of claim 26, wherein the contextual feature criteria weighs information about at least one possible target entry in the neighborhood of the at least one target entry.

29. The method of claim 26 wherein the relational feature criteria is used to determine at least one area where and within which the at least one target entry is likely to be found.

30. The method of claim 26, wherein the derived feature criteria is generated by mathematical transformations between any combination of the spatial feature criteria, the contextual feature criteria, and the relational feature criteria.

31. The method of claim 25, wherein at least one processor can comprise: the at least one ranking and/or matching processor, the at least one features processor, or the at least one re-ordering processor, or any combination thereof.

32. The method of claim 25 further comprising:
    learning characteristics of the at least one set of documents from sample documents;
    using the learned characteristics to find similar information in the at least one set of documents.

33. The method of claim 32, wherein the learned characteristics apply to at least one unknown document and/or at least one different document type.

34. The method of claim 25, further comprising:
    validating information in the at least one document to determine if the information is consistent.

35. The method of claim 34, wherein the validating comprises internal validating and/or external validating.

36. The method of claim 25, wherein the ranked possible match list based on the at least one attribute score and the at least one localization score takes into account information related to:
    text features;
    geometric features;
    graphic features;
    feature conversion; or
    any combination thereof.

37. A computer system for extracting information from at least one document in at least one set of documents, the system comprising:
    at least one processor;
    wherein the at least one processor is configured to perform:
        generating, using at least one ranking and/or matching processor, at least one ranked possible match list comprising at least one possible match for at least one target entry on the at least one document, the at least one ranked possible match list based on at least one attribute score and at least one localization score;

determining, using at least one features processor, negative features and positive features based on N-gram statistics;

determining, using at least one negative features processor, whether negative features apply to the at least one possible match;

deleting, using at least one deleting processor, any possible match to which the negative feature applies from the at least one possible match list;

determining, using at least one positive features processor, whether any of the possible matches are positive features; and re-ordering, using at least one re-ordering processor, the possible matches in the at least one possible match list based on the information learned from determining whether any of the possible matches are positive features.

38. A computerized system for extracting information from at least one document in at least one set of documents, the system comprising:

at least one processor;

wherein the processor is configured to perform:

generating, using at least one ranking and/or matching processor, at least one ranked possible match list comprising at least one possible match for at least one target entry on the at least one document, the at least one ranked possible match list based on at least one attribute score and at least one localization score.

39. A computerized system for extracting information from at least one document in at least one set of documents, the system comprising:

at least one processor;

wherein the processor is configured to perform:

generating, using at least one ranking and/or matching processor, at least one ranked possible match list comprising at least one possible match for at least one target entry on the at least one document, the at least one ranked possible match list based on at least one attribute score and at least one localization score;

determining, using at least one features processor, positive features based on N-gram statistics; and re-ordering, using at least one re-ordering processor, the possible matches in the at least one possible match list based on the information learned from determining whether any of the possible matches are positive features.

* * * * *